F. E. WRIGHT.
EYEPIECE PRISM.
APPLICATION FILED SEPT. 30, 1919.
1,417,962.
Patented May 30, 1922.
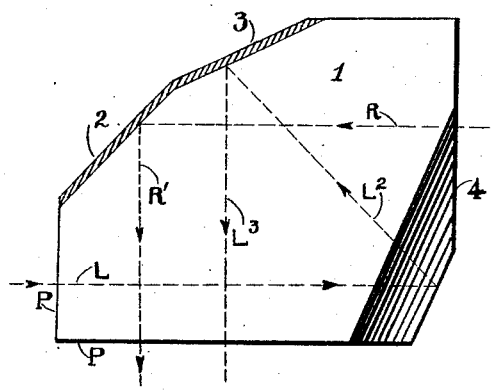
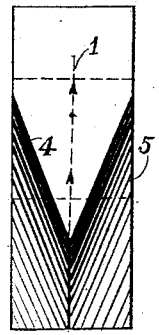
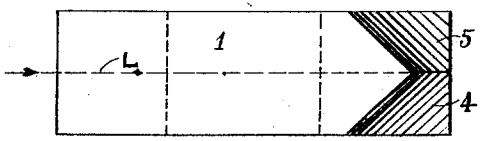
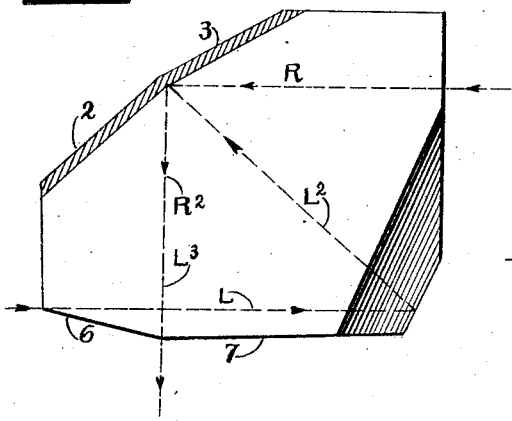
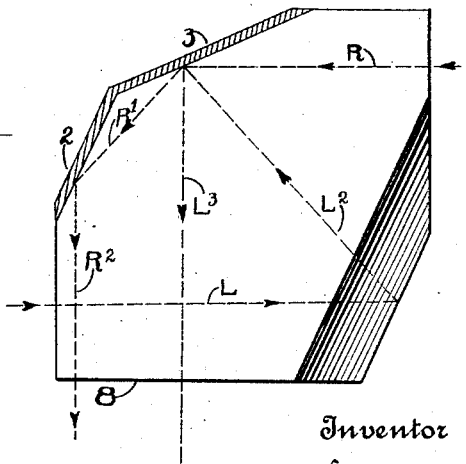
Inventor
Fred. E. Wright.

UNITED STATES PATENT OFFICE.

FREDERICK E. WRIGHT, OF WASHINGTON, DISTRICT OF COLUMBIA.

EYEPIECE PRISM.

1,417,962.  Specification of Letters Patent.  Patented May 30, 1922.

Application filed September 30, 1919. Serial No. 327,572.

(FILED UNDER THE ACT OF MARCH 3, 1883, 22 STAT. L., 625.)

*To all whom it may concern:*

Be it known that I, FREDERICK E. WRIGHT, a citizen of the United States, and resident of Washington, District of Columbia, have invented an improvement in Eyepiece Prisms, of which the following is a specification.

The invention described herein may be used by the Government, or any of its officers or employees in prosecution of work for the Government, or by any other person in the United States, without payment of any royalty thereon.

My invention relates to improvements in eye piece prisms for range finders and plans to substitute a single prism for the two prisms now commonly used in such instruments for deviating the rays of light from the optical system of each half of the telescope tube into the optical tube, so as to form partial images in the field of view. My invention, therefore, aims to eliminate errors which may arise from the displacement of one prism with relation to the other which is likely to take place when two deviating prisms are used.

Fig. 1 is a front view of my invention.
Fig. 2 is a side view of the prism.
Fig. 3 is a top view of the prism.
Fig. 4 is a front view of modification.
Fig. 5 is a front view of a second modification of the invention.

This eye piece prism consists of a single prism 1, which is, in effect, a combination of a right angle reflecting prism with a penta-prism. The hachured and shaded portions 2, 3, 4 and 5 designate the reflecting surfaces which in this case are silvered since the angle of incidence is within the critical angle of the glass. The surfaces 4 and 5 are the sides of a roof-edge inserted in the penta portion of the prism.

The rays R coming from the right side of the telesocpe tube strike the silvered surface 2 and are reflected at R' into the optical tube.

The rays L coming from the left end of the telescope tube are reflected by surfaces 4 of the roof edge, then surface 5 of the roof edge giving rays $L^2$ and surface 3 forming rays $L^3$ giving in this case three reflections. The coincidence of the partial images thus formed in the field of view symmetrical about the vertical line formed by the intersection of the silvered surfaces 2 and 3 gives a means for measuring the variable angle of the measuring triangle.

In Figure 4 the surfaces 2 and 3 are so disposed that the rays R reflected from the surface 2 are effective while those reflected from the surface 3 are diverted from the field of view and the function of this modification is to bring the dividing line of the field of view out of the glass of the prism. The dividing line of the field of view in this case being the intersection of edges 6 and 7.

In Fig. 5 the surfaces 2 and 3 are at such an angle that the rays R are reflected from surface 3 to surface 2 and thence perpendicular to emergent surface. The dividing line of the field of view in this modification is the intersection of silvered surfaces 2 and 3, as in Figure 1.

Having described my invention, what I claim as new and desire to secure by Letters Patent, is:—

1. In a base line telemeter, a single prism for deviating the rays of light which come from opposite ends of the telescope tube, comprising the integral combination of a right angle reflecting prism with a penta-prism, a silvered surface on the penta-prism, a silvered surface on the right angle prism, a dividing line for the field of view formed by the intersection of said silvered surfaces, a roof edge having silvered side surfaces inserted in the penta-prism whereby rays of light from one end of the base line are reflected from the silvered surface of the roof edge and thence to the silvered surface of the penta-prism and then into the optical tube and rays of light from the other end of the base line are reflected from the silvered surface of the right angle prism portion into the optical tube, said emergent rays being on opposite sides of said dividing line.

2. In a base line telemeter, a deviating means consisting of a single prism having silvered reflecting surfaces, a dividing line for the field of view formed exterior of the prism, by the intersection of two plain surfaces.

3. A deviating means for base line telemeters, including a single prism having reflecting surfaces and a dividing line for the field of view provided by the edge formed by the intersection of two plane surfaces of the prism.

4. A deviating means for base line telemeters, comprising a single prism adapted to receive rays from each end of the telescopic tube and having reflecting surfaces to divert the rays to the optical tube and a dividing line for the field of vision provided by the edge formed by the intersection of two plain surfaces of the prism.

FREDERICK E. WRIGHT.